United States Patent Office 3,189,233
Patented June 15, 1965

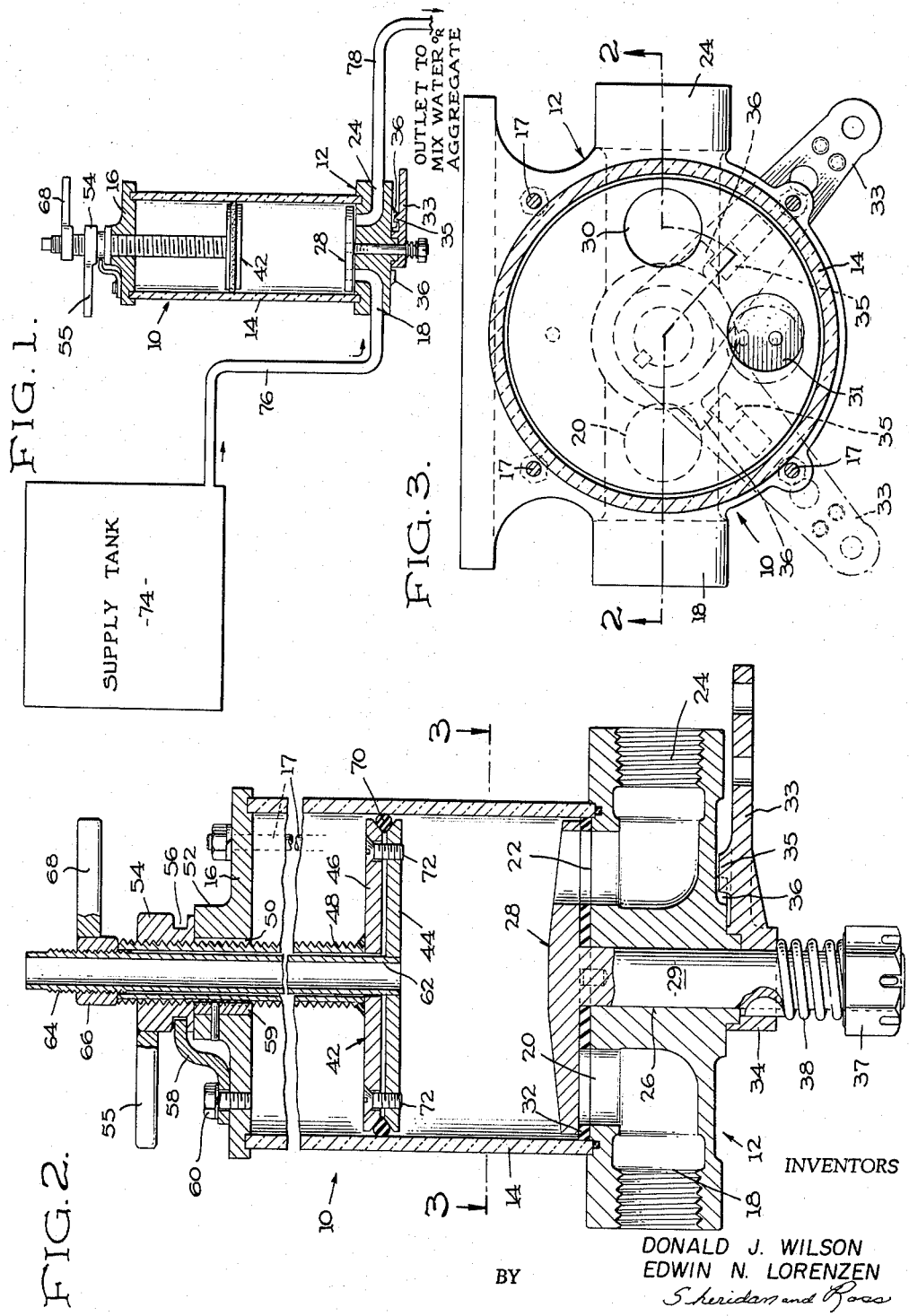

3,189,233
DEVICE FOR DISPENSING METERED
QUANTITIES OF LIQUID
Donald J. Wilson and Edwin N. Lorenzen, Denver, Colo., assignors to Protex Industries Inc., Denver, Colo., a corporation of Colorado
Filed July 17, 1963, Ser. No. 295,705
4 Claims. (Cl. 222—440)

This invention relates to a device for dispensing measured quantities of liquids, and more particularly to a dispensing device incorporating a valve mechanism which permits metered quantities of liquid to be selectively admitted into and dispensed from the dispensing device.

The dispensing device of the invention has particular utility in connection with the dispensing of metered quantities of air-entraining solutions to concrete mixes. However, the dispensing device of the invention can also be used in other applications requiring the dispensing of metered quantities of liquids.

An object of the invention is to provide a dispensing device which incorporates a valve mechanism having only a single moving part which can be selectively moved to either an in-flow, an out-flow, or a no-flow position as desired.

Another object of the invention is to provide a dispensing device having incorporated as a part thereof a single movable valve member which performs the flow control functions of a three-way plug valve, but which does not bind or stick as does a conventional three-way plug valve.

Another object of the invention is to provide a liquid dispensing device including improved means for adjusting the effective volume of the metering chamber, and hence the volume of liquid admitted into or dispensed from the device.

Still another object of the invention is to provide a dispensing device having a piston assembly which is movable to an adjusted position in the metering chamber to adjust the effective volume of the metering chamber, and including means to insure an effective seal between the adjustable piston assembly and the interior surface of the metering chamber.

In achievement of these objectives, there is provided in accordance with an embodiment of this invention a dispensing device adapted to dispense metered quantities of a liquid, such as air-entraining solution. The dispensing device includes a cylindrical container body comprising an adjustable volume metering chamber therein and vertically mounted on a base which has inlet and outlet ports. A rotatable disc valve is positioned within the container body and may be rotated to selectively place the inlet or discharge ports in communication with the metering chamber of the dispensing device, whereby the metering chamber is selectively connected to an exterior supply tank for filling, or to the discharge passage for dispensing. A piston assembly projects into the interior of the cylindrical container body of the dispensing device and may be adjusted by means of a screw and nut movement to control the volume of the metering chamber. The adjustably movable piston assembly comprises a pair of flat disc-shaped plates which cooperate to retain a sealing element at the outer periphery of the piston assembly, and means are provided to adjust the axial spacing between the plates of the piston assembly to thereby radially force the sealing element into sealing engagement with the inner wall surface of the cylindrical container body.

Further objects and advantages of the invention will become apparent from the following description taken in conjunction with the accompanying drawing in which:

FIG. 1 is a schematic diagram showing the connection of the dispensing device of the invention in a system for supplying air-entraining solution to a concrete mix;

FIG. 2 is a view in vertical section of the dispensing device of the invention, taken substantially along line 2—2 of FIG. 3; and FIG. 3 is a view in horizontal section of the dispensing device, taken substantially along line 3—3 of FIG. 2.

Referring now to the drawing, the dispensing device of the invention is generally indicated at 10 and includes a base generally indicated at 12 which supports in sealed engagement the lower end of hollow cylindrical body member or container 14 which is preferably formed of a transparent material such as "Plexiglas." In use, the dispensing device 10 is positioned with the longitudinal axis of body member 14 in a vertical position. A cover member 16 is supported in engagement with the upper end of body member 14, and is anchored by tie rods 17 to base 12.

Base 12 is provided with an inlet passage 18 which has a right angle bend interiorly of the base and terminates in an inlet port 20 directed axially of body member 14 and lying substantially in a common horizontal plane with the lower end of cylindrical body 14. Base 12 is provided at a point diametrically opposite inlet port 20 with an outlet port 22 directed axially of cylindrical body 14 and communicating with an outlet passage 24.

Base 12 is provided with an axial passage 26 to receive a rotatably movable operating shaft 29 of a disc valve generally indicated at 28. Disc valve 28 is of just slightly smaller diameter than the inner diameter of cylindrical body 14 and is provided with a pair of circular passages or openings 30 and 31 which lie at the same radial distance as the inlet port 20 and discharge port 22 from the vertical axis of cylindrical body 14. Openings 30 and 31 of the disc valve are of substantially the same diameter and area as ports 20 and 22 in base 12. However, whereas ports 20 and 22 in base 12 are circumferentially spaced apart from each other by an angular distance of substantially 180 degrees, openings 30 and 31 of disc valve 28 are spaced apart from each other by an angular distance of approximately 90 degrees.

To prevent leakage between inlet port 20 and outlet port 22, a circular gasket 32 is cemented and pinned to the upper surface of base 12. Gasket 32 has openings therethrough conforming to inlet port 20 and to discharge port 22, and also to permit passage therethrough of shaft 29.

An operating lever 33, including a hub portion 34, is keyed to shaft 29 immediately below base 12. Lever 33 includes an upstanding lug member 35 which is engageable with a stop member 36 at each end of the arcuate path of movement of lever 33, corresponding to the inflow and outflow positions, respectively, of rotatable disc valve 28.

A nut member 37 is threadedly attached to the lower end of valve operating shaft 29 below base 12, and a spring 38 is interposed between the lower surface of hub portion 34 of valve operating lever 33 and the upper surface of nut member 37 to thereby downwardly bias disc valve 28 and its operating shaft 29 and to upwardly bias lever 33 toward the under surface of base 12.

In order that the container body member 14 may receive and dispense a predetermined metered quantity of liquid, an adjustably movable piston assembly generally indicated at 42 is provided. The piston assembly includes a pair of flat, disc-shaped plates 44 and 46. Upper plate 46 is rigidly secured, as by welding, to a metal tubular member 48 which extends through an axial passage 50 in cover member 16 of dispenser 10. Tubular member 48 is externally threaded for substantially the entire height thereof and is in threaded engagement with an internally threaded piston control nut 54 which rests on the upper surface of an upwardly extending hub 52 integral with cover member 16. Piston control nut 54 is rotated by means of a lever 55 integral with the nut. Nut 54 is provided intermediate its height with a circumferential groove 56 which receives a retainer strap 58 secured by retainer cap screw 60 which is in threaded engagement with cover member 16. Retainer strap 58 restrains nut 54 against axial movement. Piston assembly 42 is restrained from rotation by a key 59 secured to hub 52 of cover 16, key 59 engaging a vertical key-way or slot in threaded outer tubular member 48. Thus rotation of piston control nut 54 by lever 55 imparts vertical axial movement to piston assembly 42 due to the threaded engagement of outer tubular member 48 and threaded nut 54.

An inner tubular member 62 of slightly smaller diameter than the inner diameter of outer tubular member 48 extends through outer tubular member 48 in coaxial relation therewith and is rigidly secured, as by welding, to lower plate 44 of piston assembly 42. Inner tubular member 62 is unthreaded for most of its height except for an externally threaded portion 64 thereof which extends above the upper end of outer tubular member 48.

A packing control nut 66 having an integral operating lever 68 is positioned in threaded engagement with threaded portion 64 of upper tubular member 62, the lower surface of nut 66 bearing against the upper end of outer tubular member 48.

The lower flat disc plate 44 of piston assembly 42 is of greater diameter at its lower surface than at its upper surface, with the peripheral surface of plate 44 tapering radially inwardly from the lower to the upper surface of the plate. On the other hand upper plate 46 of piston assembly 42 is of greater diameter at its upper surface than on its lower surface, with the outer peripheral surface of plate 46 tapering radially inwardly from the larger diameter upper surface to the smaller diameter lower surface of plate 46. The tapered peripheral surfaces of the two plates 44 and 46 of piston assembly 42 cooperate to define a peripheral groove which receives an O sealing ring 70. The lower plate 44 of piston assembly 42 is provided with threaded passages to receive screws 72 the upper portions and heads of screws 72 being received in unthreaded countersunk passage in upper plate 46. Screws 72 do not rigidly secure plate members 44 and 46 together, but rather serve as stop members which limit the axial movement of plates 44 and 46 away from each other, but do not prevent the movement of plates 44 and 46 toward each other.

Due to the provision of the axially adjustable plates 44 and 46 as just described, if the O ring packing 70 becomes loose or worn, packing control nut 66 on threaded portion 64 of inner tubular member 62 may be rotated by means of lever handle 68 to axially move lower plate 44 vertically upwardly toward upper plate 46 to thereby cause a radial thrust which urges the O ring 70 radially outwardly into sealing engagement with the inner surface of body member 14.

Inner tubular member 62 is open at both its lower and upper ends and thus serves as a vent which communicates the inside of the metering chamber below plate 44 with the outside atmosphere. The tube 62 is dimensioned so that its upper end extends above the dispensing tank so that liquid from the supply tank will not rise to the level of the tube and overflow. A tubular extension could, of course, be used on tube 62 to prevent overflow.

The operation of the device of the invention will be described in its application to dispensing metered quantities of air-entraining solutions to concrete mixes, although it is not limited to this application but can be used in any application wherein metered quantities of liquid are to be dispensed.

The amount of liquid admitted to and discharged from body member 14 is controlled by adjusting the height of piston assembly 42 within body member 14, thereby adjusting the volume of the metering chamber defined by the space between the piston assembly 42 and disc valve 28. This is done by rotating lever 55 of control nut 54 to thereby axially move threaded tube 48 to move piston assembly 42 to the desired height within body member 14. During the axial movement of outer tubular member 48, inner tubular member 62 moves with member 48 due to the connection of plates 44 and 46 to each other by screws 72 and the arrangement of handle 68 threadedly attached to threaded portion 64 and seated on the top of outer tubular member 48. Suitable calibrating indicia may be placed on the surface of transparent body member 14 to indicate the volume corresponding to various adjusted positions of piston assembly 42, and this calibration is made taking into consideration liquid in tube 62.

To admit a metered quantity of liquid from supply tank 74 to dispensing device 10, control lever 33 is rotated to a position in which opening 31 of disc valve 28 communicates with inlet port 20 in base 12. In this position of disc valve 28, discharge port 22 in base 12 is covered by an unapertured area of disc valve 28. Liquid flows by gravity from supply tank 74 through conduit 76 to inlet passage 18 and thence through inlet port 20 to the interior of the metering chamber. Inner tubular member 62 serves as an air vent.

If it is desired to dispense the contents of body member 14 to discharge port 22, control lever 33 is rotated 90 degrees from the position just described to cause opening 30 in the disc valve to register with discharge port 22 in base 12. The liquid contents of the metering chamber within body 14 are then discharged by gravity flow through disc valve opening 30, discharge port 22, and through outlet passage 24 and conduit 78 to a point where the liquid is to be used. The vent to atmosphere provided by hollow tubular member 62 promotes the discharge of liquid from the metering chamber. When the dispensing device is not in operation, valve control handle 33 is moved to an intermediate position approximately half way between its inlet and outlet positions, in which intermediate position neither of the disc valve openings 30 and 31 registers with the ports 20 and 22. In this neutral or intermediate position of the disc valve 28, liquid is neither admitted to nor discharged from device 10, although any liquid already present within the metering chamber of body member 14 due to a previous connection to supply tank 74 will remain in the metering chamber ready for dispensing.

While valve control lever 33 has been described as being manually operated, it may also be electrically or mechanically operated by suitable control means, such as a hydraulic ram, if desired.

If packing ring 70 becomes losse or worn, the lower plate 44 of piston assembly 42 may be moved upwardly toward upper plate 46 by rotating packing control nut 66 on the threaded portion 64 of inner tube or shaft 62, to thereby move inner tubular member 62 upwardly relative to outer tubular member 48, to radially outwardly compress the O ring packing 70.

It can be seen from the foregoing that there is provided in accordance with this invention a dispensing device which permits dispensing measured amounts of a liquid by means of a valve mechanism having only one moving part which does not bind or stick. Furthermore, the use of two relatively movable plates in the piston assembly provides a convenient and effective means for supporting the sealing means between the piston and the body of the dispensing device in a manner which permits adjustment of the seal if it becomes loose or worn.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What is claimed is:

1. A device for dispensing liquids comprising a base member, a substantially cylindrical hollow body member upstanding from said base member, a liquid inlet port and a liquid outlet port carried by said base member in circumferentially spaced relation to each other and opening toward said body member, a disc valve rotatably mounted in said body member in overlying relation to said inlet and outlet ports, said disc valve having passage means therethrough selectively movable into a position of registry with either one of said ports to thereby selectively communicate the interior of said body member with said one of said ports, said disc valve when in said position of registry serving as a closure to prevent communication between the other of said ports and the interior of said body member, a piston member in said body member in axially spaced position above said disc valve, said piston member comprising a pair of disc-shaped plates positioned in axially superposed relation to each other, attachment means connecting said plates restricting their separation and permitting their unlimited movement toward each other, said plates being contoured at their respective outer peripheries to cooperatively support a peripheral sealing ring engageable with the cylindrical inner surface of said body member, a peripheral sealing ring supported by said plates, a first and a second tubular member positioned in coaxial relation to each other and each respectively attached to one of said plates, said tubular members extending axially of said body member, and means for axially moving one of said tubular members relative to the other of said tubular members to axially move said plates toward each other, whereby to force said sealing ring into sealing engagement with said cylindrical inner surface of said body member.

2. A device for dispensing liquids comprising a base member, a substantially cylindrical hollow body member upstanding from said base member, a liquid inlet and a liquid outlet port carried by said base member in circumferentially spaced relation to each other and opening toward said body member, a disc valve rotatably mounted in said body member in overlying relation to said inlet and outlet ports, said disc valve having passage means therethrough selectively movable into a position of registry with either one of said ports to thereby selectively communicate the interior of said body member with said one of said ports, said disc valve when in said position of registry serving as a closure to prevent communication between the other of said ports and the interior of said body member, a cover member closing the upper end of said body member, a piston in said body member in axially spaced relation above said disc valve, an axially extending threaded member extending through said cover member and supporting said piston member within said hollow body member, said threaded member having a vertical key-way in its outer surface, a vertically disposed key fixed to said cover extending into said key-way to prevent rotation of said threaded member with respect to said cover, nut means threadedly engaging said axially extending threaded member, said nut means being constrained against axial movement, whereby rotation of said nut means on said axially threaded member is effective to impart axial movement to said threaded member and to said piston supported thereby, said piston being thereby axially movable to an adjusted position to provide a metering chamber of predetermined volume in said body member between said disc valve and said piston.

3. A device for dispensing liquids comprising a base member, a substantially cylindrical hollow body member upstanding from said base member, liquid inlet port means and liquid outlet port means carried by said base member, means for selectively placing either one of said port means in communication with the interior of said body member and for simultaneously preventing communication between the other of said port means and the interior of said body member, a cover member closing the upper end of said body member, a piston in said body member in axially spaced relation above said port means, an axially extending threaded member extending through said cover member and supporting said piston member within said hollow body member, said threaded member having a vertical key-way in its outer surface, a vertically disposed key fixed to said cover extending into said key-way to prevent rotation of said threaded member with respect to said cover, nut means having a peripheral groove in its outer surface threadedly engaging said axially extending threaded member, a retainer strap mounted with one end attached to said cover and its other end riding in said groove to prevent axial travel of said nut means whereby rotation of said nut means on said axially threaded member is effective to impart axial movement to said threaded member and to said piston supported thereby, said piston being thereby axially movable to an adjusted position to provide a metering chamber of predetermined volume in said body member between said port means and said piston.

4. A device for dispensing liquids comprising a base member, a substantially cylindrical hollow body member upstanding from said base member, a liquid inlet and a liquid outlet port carried by said base member in circumferentially spaced relation to each other and opening toward said body member, a disc valve rotatably mounted in said body member in overlying relation to said inlet and outlet ports, said disc valve having passage means therethrough selectively movable into a position of registry with either one of said ports to thereby selectively communicate the interior of said body member with said one of said ports, said disc valve when in said position of registry serving as a closure to prevent communication between the other of said ports and the interior of said body member, a valve shaft connected by one end to said disc valve with its other end extending through said base, a horizontally disposed operating lever attached to said valve shaft below said base having a camming lug on its upper surface cooperating with a stop on the bottom of said base to lock and unlock said valve disc against movement, a clamping nut on said other end, a spring around said other end between said clamping nut and the bottom of said lever biasing said disc valve downwardly against the top of said base member, a cover member closing the upper end of said body member, a piston in said body member in axially spaced relation above said disc valve, an axially extending threaded member extending through said cover member and supporting said piston member within said hollow body member, said threaded member having a vertical key-way in its outer surface, a vertically disposed key fixed to said cover extending into said key-way to prevent rotation of said threaded member with respect to said cover, nut means having a peripheral groove in its outer surface threadedly engaging said axially extending threaded member, a retainer strap mounted with one end attached to said cover and its other end riding in said groove to prevent axial travel of said nut means, whereby rotation of said nut means on said axially threaded member is effective to impart axial movement to said threaded member and to said piston supported thereby, said piston being thereby axially moveable to an adjusted position to provide a metering chamber of predetermined volume in said body member between said valve disc and said piston.

References Cited by the Examiner

UNITED STATES PATENTS

| 720,492 | 2/03 | Sedberry | 222—452 X |
| 1,041,524 | 10/12 | Snyder et al. | 222—390 |
| 1,161,557 | 11/15 | Weatherhead | 222—452 X |
| 2,578,215 | 12/51 | Wilson | 222—440 |
| 2,736,463 | 2/56 | Levine | 222—440 X |
| 2,795,361 | 6/57 | Pechy | 222—440 |
| 3,068,054 | 12/62 | Schmidt | 92—250 X |

LOUIS J. DEMBO, *Primary Examiner.*